(12) United States Patent
Essert et al.

(10) Patent No.: US 11,804,752 B2
(45) Date of Patent: Oct. 31, 2023

(54) DRIVE, COMPRISING AN ELECTRIC MOTOR WITH A BRAKE, A FAN COWL, AND A ROD FOR MANUALLY ACTUATING THE BRAKE, AND PROCESS FOR MANUFACTURING A DRIVE

(71) Applicant: SEW-EURODRIVE GMBH & CO. KG, Bruchsal (DE)

(72) Inventors: Steffen Essert, Bruchsal (DE); Andreas Lutz, Rheinstetten (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 407 days.

(21) Appl. No.: 16/961,856

(22) PCT Filed: Dec. 12, 2018

(86) PCT No.: PCT/EP2018/025318
§ 371 (c)(1),
(2) Date: Jul. 13, 2020

(87) PCT Pub. No.: WO2019/137599
PCT Pub. Date: Jul. 18, 2019

(65) Prior Publication Data
US 2020/0358335 A1    Nov. 12, 2020

(30) Foreign Application Priority Data
Jan. 12, 2018    (DE) ..................... 10 2018 000 180.7

(51) Int. Cl.
*H02K 7/102*    (2006.01)
*H02K 9/14*    (2006.01)
*H02K 15/14*    (2006.01)
*H02K 5/20*    (2006.01)

(52) U.S. Cl.
CPC ............. *H02K 7/1023* (2013.01); *H02K 9/14* (2013.01); *H02K 15/14* (2013.01); *H02K 5/207* (2021.01); *H02K 2209/00* (2013.01)

(58) Field of Classification Search
CPC ....... H02K 7/1025; H02K 7/12; H02K 7/1023
USPC .................................... 310/77, 75 R, 78, 93
See application file for complete search history.

(56) References Cited

U.S. PATENT DOCUMENTS

| | | | | |
|---|---|---|---|---|
| 2,620,901 A | * | 12/1952 | Stearns | F16D 65/46 188/161 |
| 3,045,782 A | | 7/1962 | Hansen | |
| 6,125,975 A | * | 10/2000 | Seeto | F16D 55/28 188/72.3 |
| 6,781,264 B1 | * | 8/2004 | Conrad | H02K 7/1025 310/77 |

(Continued)

FOREIGN PATENT DOCUMENTS

| | | | |
|---|---|---|---|
| DE | 1026407 B | | 3/1958 |
| DE | 1130514 | * | 5/1962 |

(Continued)

*Primary Examiner* — Jose A Gonzalez Quinones
(74) *Attorney, Agent, or Firm* — CARTER, DELUCA & FARRELL LLP (57) ABSTRACT

A drive includes an electric motor with a brake and a fan cowl. The fan cowl is connected to a housing, in particular to a stator housing part, of the electric motor in a detachable manner. A rod is able to be passed through a cover part, which projects through a recess, in particular a recess arranged in the form of a slot, in the fan cowl.

23 Claims, 7 Drawing Sheets

(56) References Cited

U.S. PATENT DOCUMENTS 7,100,747 B1    9/2006  Conrad et al.

FOREIGN PATENT DOCUMENTS

| | | | |
|---|---|---|---|
| DE | 1130514 B | 5/1962 | |
| DE | 10052910 A1 | 7/2002 | |
| DE | 20218026 U1 | 1/2003 | |
| DE | 10238336 A1 | 2/2004 | |
| DE | 202004015271 U1 | 2/2006 | |
| DE | 102008025432 A1 | 9/2009 | |
| DE | 102008028604 A1 | 12/2009 | |
| DE | 102008028604 A1 * | 12/2009 | ........... H02K 7/1025 |
| DE | 102010049748 A1 | 5/2012 | |
| DE | 102012205710 A1 | 10/2013 | |
| DE | 102012019415 A1 | 4/2014 | |
| EP | 2493058 A1 | 8/2012 | |
| EP | 2493058 A1 * | 8/2012 | ............ H02K 7/102 |
| GB | 965187 A * | 7/1964 | |
| JP | 11127554 A * | 5/1999 | |
| JP | H11-127554 A | 5/1999 | |
| WO | 2016083398 A1 | 6/2016 | |

* cited by examiner

DRIVE, COMPRISING AN ELECTRIC MOTOR WITH A BRAKE, A FAN COWL, AND A ROD FOR MANUALLY ACTUATING THE BRAKE, AND PROCESS FOR MANUFACTURING A DRIVE

FIELD OF THE INVENTION

The present invention relates to a drive having an electric motor with a brake, a fan cowl, and a rod for manually actuating the brake, and it relates to a method for manufacturing a drive.

BACKGROUND INFORMATION

European Patent Document No. 2 493 058 describes that a fan cowl at least partially surrounds a fan.
German Patent Document No. 202 18 026 describes a device for manually lifting a spring brake on an electric brake motor.
German Patent Document No. 102 38 336 describes a motor series.
German Patent Document No. 10 2008 028 604 describes an electric motor having an electromagnetically actuable brake.
Japanese Patent Document No. 11-127554 describes an electromagnetic brake.
German Patent Document No. 20 2004 015 271 describes an electric drive unit for vehicles.
German Patent Document No. 10 2012 205 710 describes a stator segment of an electric machine.
German Patent Document No. 10 2008 025 432 describes a terminal connection block.
PCT Patent Document No. WO 2016/083398 describes a manufacturing process step for an automobile component.

SUMMARY

Example embodiments of the present invention provide a drive by which greater safety may be achieved.

According to an example embodiment of the present invention, a drive has an electric motor with a brake, a fan cowl and rod, in particular a lever part, for the manual actuation, in particular the lifting, of the brake. The fan cowl is connected to a housing part, in particular to a stator housing part of the electric motor, in a detachable manner. The rod is disposed so as to be moveable, with the rod being guided through a cover part, which projects through a slot in the fan cowl.

According to an example embodiment of the present invention, a drive includes an electric motor with a brake and a fan cowl, with the fan cowl being connected to a housing part, in particular to a stator housing part of the electric motor, in a detachable manner. A rod is able to be guided through a cover part, which projects through a recess situated in the fan cowl, in particular a recess embodied in the form of a slot. In particular, the rod is situated on the brake in a movable, in particular a pivotable manner, and the rod, in particular the rod arranged as a lever part, is provided for the manual actuation, in particular the lifting, of the brake.

This offers the advantage that no finger is able to penetrate because the cover part seals the free area of the slot of the fan cowl. Nevertheless, the rod is movable because the cover part is movably guided on the fan cowl. A snap-in connection is used for this purpose, which is unobstructed in the axial direction. In other words, the snap-in connection is obtained only in a radial and a circumferential direction.

The mentioned directions refer to the axis of rotation of the rotor of the motor.

The cover part may be produced from a softer material than the fan cowl. The fan cowl may be produced from metal sheet and the cover part from rubber or plastic.

As a result, greater safety is achievable.

According to example embodiments, the cover part is situated so as to allow for a relative movement with respect to the fan cowl. In particular, the cover part together with the rod is able to be moved back and forth during its pivot motion. This has the advantage of providing better sealing and greater safety against contact with movable parts.

According to example embodiments, the cover part is snapped into the fan cowl, in particular into the slot of the fan cowl. This is considered advantageous insofar as a simple connection technique may be used. In addition, the introduction of the cover part during the snap-in process is able to be obtained from the radial direction. The snap-in connection has no effect in the axial direction, and a low coefficient of friction may be obtained for the relative axial displacement of the insertion part with respect to the fan cowl.

The use of rubber as the material for the cover part makes it possible to achieve great tightness in the contact region between the cover part and the fan cowl.

According to example embodiments, the cover part includes a plate-shaped area and a guide region which is connected to the plate-shaped area and on which first groove sections are provided, which are set apart from one another in the circumferential direction and into which the fan cowl, in particular a respective edge region of the slot of the fan cowl, projects. This offers the advantage that the guide region guides the cover part at the edge region of the slot of the fan cowl, in particular in a movement along the slot, i.e., in an axial direction. The plate-shaped area is used for covering the slot and in the process provides sealing between the fan cowl and the cover part.

According to example embodiments, the area covered by the recess in the axial direction is greater than the area covered by the guide region, with the area covered by the plate-shaped area in the axial direction being greater than the area covered by the recess. This is considered advantageous insofar as the recess is covered in the outward direction.

According to example embodiments, second groove sections are provided on the guide region, which are set apart from the first groove sections in the axial direction. This is considered advantageous insofar as a stable guidance is able to be obtained.

According to example embodiments, each one of the groove sections has two depressions which are set apart from each other in the circumferential direction. This offers the advantage that the cover part is able to be used for fan cowls having different wall thicknesses. This is because a first fan cowl having thinner walls than a second fan cowl is able to be snapped into a first one of the depressions and then rests against the plate-shaped area, and the second fan cowl is able to be snapped in as an alternative and then fills both depressions and is thereby accommodated in the groove section in a stable manner. In particular, the fan cowl then rests radially against the cover part on both sides.

According to example embodiments, the depression of the respective groove section facing the plate-shaped area is provided with an insertion bevel, in particular an insertion bevel pointing toward the plate-shaped area. This offers the advantage that the first fan cowl, i.e., in particular the thinner-walled fan cowl, is guided toward the plate-shaped area, with the result that only a minor force is required for the press-in operation.

According to example embodiments, the fan cowl is situated in the depression of the respective groove region facing the plate-shaped area, and/or the fan cowl rests against a radially inner surface area of the plate-shaped area, with the other depression of the respective groove region being set apart from the fan cowl. This is considered advantageous in that centering of the fan cowl with respect to the cover part is obtained, so that a defined contact of the plate-shaped area with the fan cowl is able to be achieved in order to produce a tight connection.

According to example embodiments, the guide region of the cover part projects through the slot situated in the fan cowl, and/or the plate-shaped area rests on the radially outer surface area of the cover part. This offers the advantage that the cover part is secured on the fan cowl in a keyed manner. In addition, sealing from the fan cowl is achievable with the aid of the plate-shaped area.

According to example embodiments, a depression is situated in the cover part, in which a recess is situated, in particular in a centered manner, which extends radially through the cover part. This offers the advantage that the rod is able to be guided through the depression, the diameter of the rod being greater than the inner diameter of the uninterrupted recess, however.

According to example embodiments, tab areas are situated inside the depression, which are integrally arranged, in particular in one piece, with the cover part, in particular with the guide region of the cover part. This offers the advantage that a human finger is unable to reach through the uninterrupted recess because the recess is too narrow, and the tab regions prevent a human finger from reaching through the tab areas because a threshold value of an amount of force is exceeded and this amount of force is thus unable to be applied by a human finger.

Because the rod is not simply displaced in the axial direction during the actuation of the manual lifting of the brake but is pivoted about a pivot point situated on the brake, the tab areas are always deflected to a greater extent during the pivot motion and always correspondingly less during the return rotation.

According to example embodiments, the tab areas are elastically deflected and/or press against the rod in an elastically tensioned manner. This offers the advantage that the cover part is connected to the rod by force locking. The connection in particular is such that in a displacement of the rod in the axial direction, the cover part is carried along, with the cover part being guided in the groove sections of the guide region.

According to example embodiments, the tab areas are set apart from one another at regular intervals, in particular with the aid of slots. This offers the advantage that it improves the manufacture and the rod is able to be guided through the depression with little force. A number of three or more tab areas, in particular, is considered advantageous because it is possible to avoid arching of the cover part or tensions in the cover part.

According to example embodiments, the depression has a cylindrical shape, the tab areas in each case cover the same circumferential angle amount in the circumferential direction around the cylinder axis of the depression and are set apart from one another at regular intervals, the tab areas cover the same radial distance region in relation to the cylinder axis, and the tab areas cover the same axial region in each case, in particular, a slot being arranged in the circumferential direction between the tab areas in relation to the cylinder axis, which extends radially from the guide region to the uninterrupted recess in relation to the cylinder axis. This offers the advantage that a cross slot is thus able to be provided at the bottom of the depression and the rod may therefore be guided through with little force. In addition, given the small number of tab areas, in particular four tab areas, sufficiently great contact pressure of the tab areas with respect to the rod is achievable.

According to example embodiments, the amount of force to be generated in order to achieve the elastic deflection of the tab areas, in particular by the rod when pushing through the depression, is greater than the amount of force to be maximally applied by a test finger according to a standard. This is considered advantageous insofar as greater safety is achievable with minimal effort.

According to example embodiments, the uninterrupted recess is situated radially within the radial distance region covered by the tab areas in relation to the cylinder axis. This offers the advantage that the rod is situated in the depression in a centered manner after the rod has been guided through the depression, in particular the uninterrupted depression.

According to an example embodiment of the present invention, in a method for manufacturing a drive that includes an electric motor with a brake, a fan cowl and rod, in particular a lever part, for the manual actuation, in particular lifting, of the brake, the fan cowl is connected to a housing part, in particular to a stator housing part, of the electric motor in a detachable manner, the rod is disposed in a moveable manner, the rod is guided through a cover part, which projects through a slot situated in the fan cowl, a first or a second fan cowl is optionally used as the fan cowl, with the wall thickness of the first fan cowl being less than the wall thickness of the second fan cowl, the cover part having a groove section whose groove width is equal to the wall thickness of the second fan cowl, in particular, the groove section having two depressions which are radially set apart from each other, with the first fan cowl being situated in only one of the two depressions, i.e., being set apart from the other of the two depressions, and the second fan cowl filling and/or covering both depressions.

This has the advantage that the cover part may be used for two fan cowls having different thicknesses. For example, even the thin-walled fan cowl is able to be retained in the groove section without play because this groove section is provided with depressions, with a first one of these depressions being adapted to the fan cowl.

Further features and aspects of example embodiments of the present invention are described in greater detail below with reference to the appended Figures.

DETAILED DESCRIPTION

As schematically illustrated in the Figures, fan cowl 2 has a recess which is covered by cover part 1.

Fan cowl 2 surrounds a fan, which is situated in an axial end region of an electric motor. The electric motor has a stator housing H, e.g., a housing part and/or a stator housing part, to which the fan cowl is connected in a detachable manner.

Fan cowl 2 is used for directing the airflow conveyed by the fan towards outlet openings, from where the airflow emerges and flows along the outside of the stator housing. Effective cooling of the motor is able to be achieved in this manner.

In its axial end region pointing away from the motor, fan cowl 2 has a grid with grid openings through which the airflow aspirated by the fan travels.

The axial direction extends parallel to the axis of rotation of the rotor of the electric motor, with the rotor being rotatably mounted in relation to the stator housing.

In addition, an electromagnetically actable brake B, which is radially surrounded by fan cowl 2, is situated in the axial end region of the motor.

For the manual lifting of the brake, e.g., in a failure of the public electric grid, a rod 3 is provided, which is able to be operated from the surroundings, i.e., from outside fan cowl 2.

For the connection of rod 3 to the brake, rod 3 is guided through cover part 1. Cover part 1 has an uninterrupted recess for this purpose.

After the connection to the brake, rod 3 is rotatably supported, with the associated pivot joint being situated on the brake. The axis of rotation is aligned perpendicular to the axis of rotation of the rotor shaft, the two axes of rotation in particular being set apart from each other. During the rotary motion, rod 3 is pivotable within a plane that encompasses the axis of rotation of the rotor shaft or is situated in parallel therewith. In other words, rod 3, in particular the center of gravity of rod 3, is also moved in the axial direction for the manual lifting of the brake and moved back in the axial direction for the release.

In the released state, no manual lifting exists so that the actuation of the brake takes place electromagnetically. When a brake coil of the brake is energized, the brake is lifted, and when the energization of the brake coil fails to take place, the brake is applied.

Cover part 1 is situated so as to allow for a relative movement with respect to fan cowl 2.

To this end, the recess is arranged in the form of an axial slot so that cover part 1 together with rod 3 is able to be moved back and forth during its pivot motion.

The wall thickness of fan cowl 2 is constant in the contact region with cover part 1.

Cover part 1 may be formed from rubber or a plastic material.

Cover part 1 has a plate-shaped area which rests against the outer side of fan cowl 2 and in the process covers the recess embodied as an axial slot in fan cowl 2.

Formed on this plate-shaped area is a guide region that projects through the recess and has groove sections 50 on the side into which fan cowl 2 is snapped.

A first one of groove sections 50 is situated in the front end region of the guide region in the circumferential direction.

A second one of groove sections 50 is situated in the rear end region of the guide region in the circumferential direction.

A third groove region 50 is arranged in a similar manner as the first of groove sections 50 and is axially set apart therefrom, but in the same radial position and circumferential angular position.

A fourth groove section 50 is arranged in a similar manner as the second of groove sections 50 and axially set apart therefrom, but in the same radial position and circumferential angular position.

Groove sections 50 in the front end region in the circumferential direction are thus axially set apart from one another.

In the same manner, groove sections 50 in the rear end region in the circumferential direction are axially set apart from one another.

The area axially covered by the guide region also encompasses the regions axially covered by groove sections 50.

The circumferential angular region covered by first groove section 50 is set apart from the circumferential angular region covered by second groove section 50 in the circumferential direction.

Each groove section 50 has two depressions, which are situated next to each other in the radial direction and extend in the axial direction in each case.

Cover part 1 is radially pressed into the axial slot of the fan cowl to such a depth that the fan cowl is snapped into the depression situated farther outside in the radial direction. Thus, fan cowl 2 rests against the radially outer groove wall of respective groove section 50. In other words, the fan cowl is retained in the radially outer of the two depressions in that the fan cowl is situated in the radially outer of the two depressions.

Fan cowl 2 may be made from steel sheet.

Cover part 1 is also able to be used for fan cowls that have a greater wall thickness. Wall thicknesses that correspond to the maximum radial extension of the two depressions are allowed. In such a case, instead of being produced from sheet metal, fan cowl 2 may particularly be produced from a cast, the cast, e.g., being an aluminum cast on which an angle sensor is then able to be supported. In a configuration from a cast, the fan cowl may completely fill the respective groove section and thus is snapped in, i.e., retained, in a keyed manner. The fan cowl rests against the groove walls of the groove on both sides, i.e., in particular radially on the inside and outside.

Figure 5:
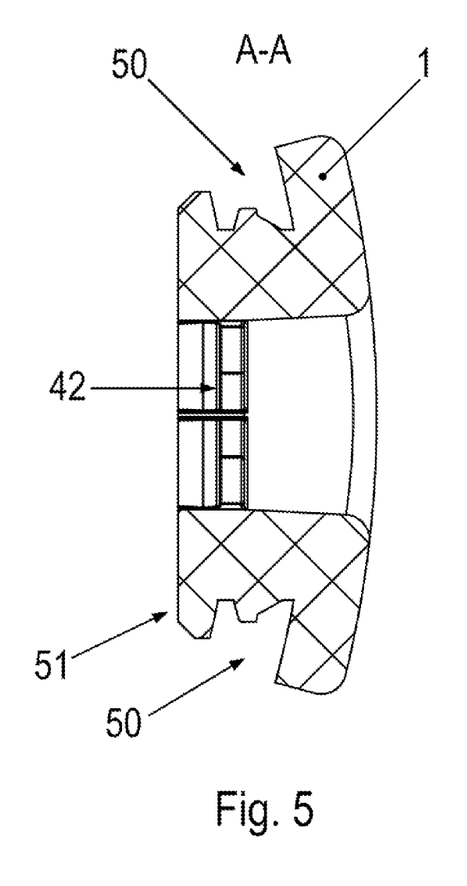
FIG. 5 is a schematic cross-sectional view through cover part.
Figure 6:
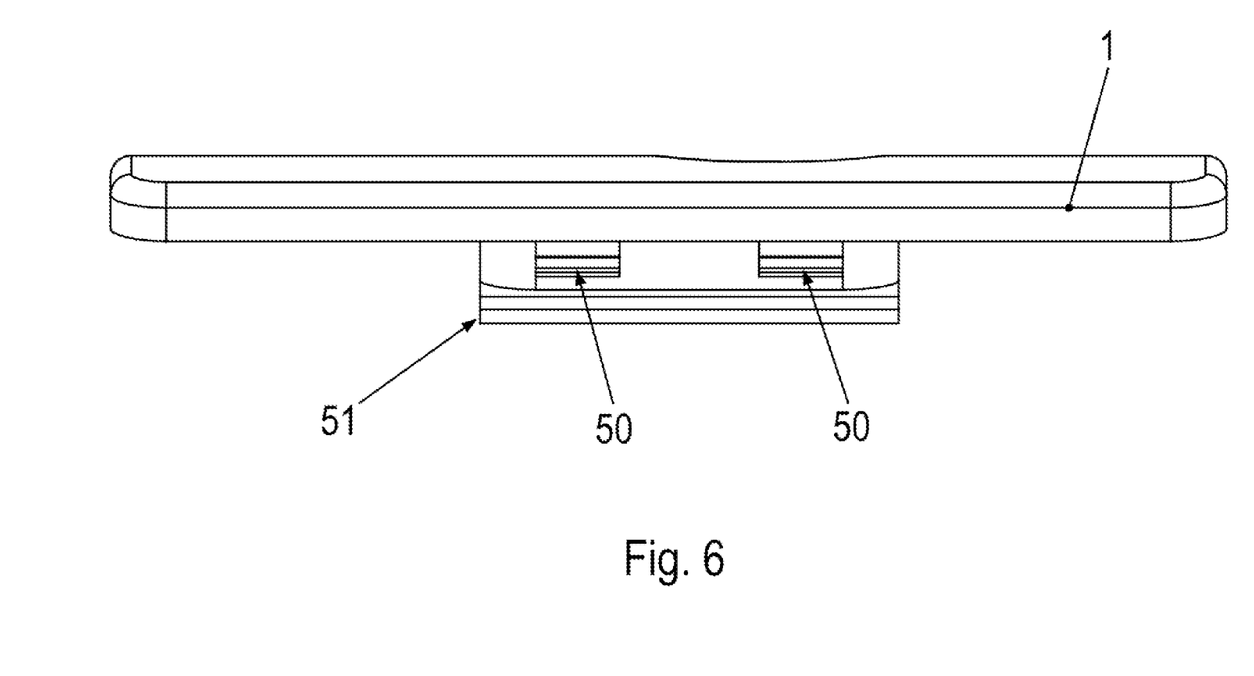
FIG. 6 is a schematic side view of cover part.

FIG. 5 is a schematic cross-sectional view through cover part 1. When cover part 1 is placed on top of fan cowl 2 produced from sheet metal, it is resting against the underside of the plate-shaped area and is snapped into place in the lower of the two depressions of groove section 50.

In the thin-walled embodiment of fan cowl 2, and thus in particular when using very thin sheet metal, a bevel inside the deeper of the two depressions causes the fan cowl to slide in the direction of the plate-shaped area when being snapped in, i.e., to lie against the underside of the plate-shaped area. In other words, the deeper depression of the two depressions of groove section 50 in the circumferential direction also has an insertion bevel, so to speak. After the fan cowl is introduced into this depression, the fan cowl is situated at the particular radial distance in which the guide region of cover part 1 has the smallest extension in the axial region covered by groove section 50 in the circumferential direction.

With the thicker arrangement of fan cowl 2, and thus in particular when using a cast as the material for fan cowl 2, fan cowl 2 is resting against the underside of the plate-shaped area of cover part 1 with its radially outer surface and against the groove wall of groove section 50 facing away from the plate-shaped area with its radially inner surface.

The schematic cross-sectional view of FIG. 5 pertains only to two of the four groove sections 50.

After cover part 1 is snapped into the axial slot of the fan cowl, groove sections 50 as a whole function as an axially directed guide for cover part 1. The axial slot may have a constant slot width, in particular at least in the particular region in which the guidance of cover part 1 is to be provided.

Figure 1:
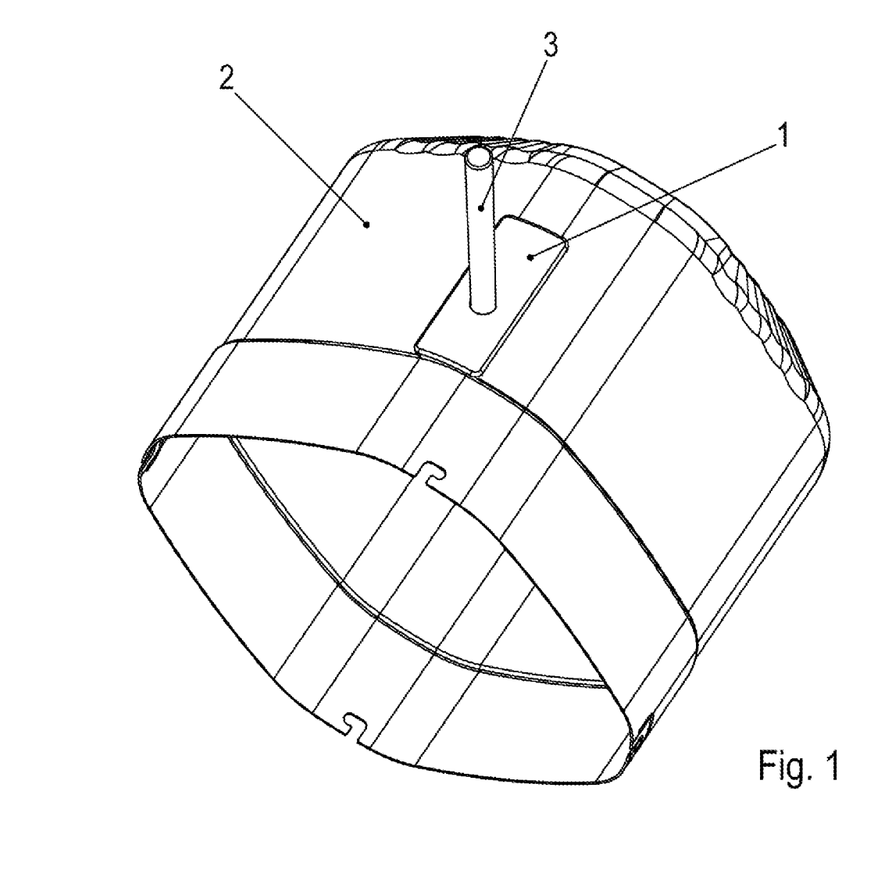
FIG. 1 is a schematic perspective view of a fan cowl having a cover part, with a rod being guided through cover part.
Figure 2:
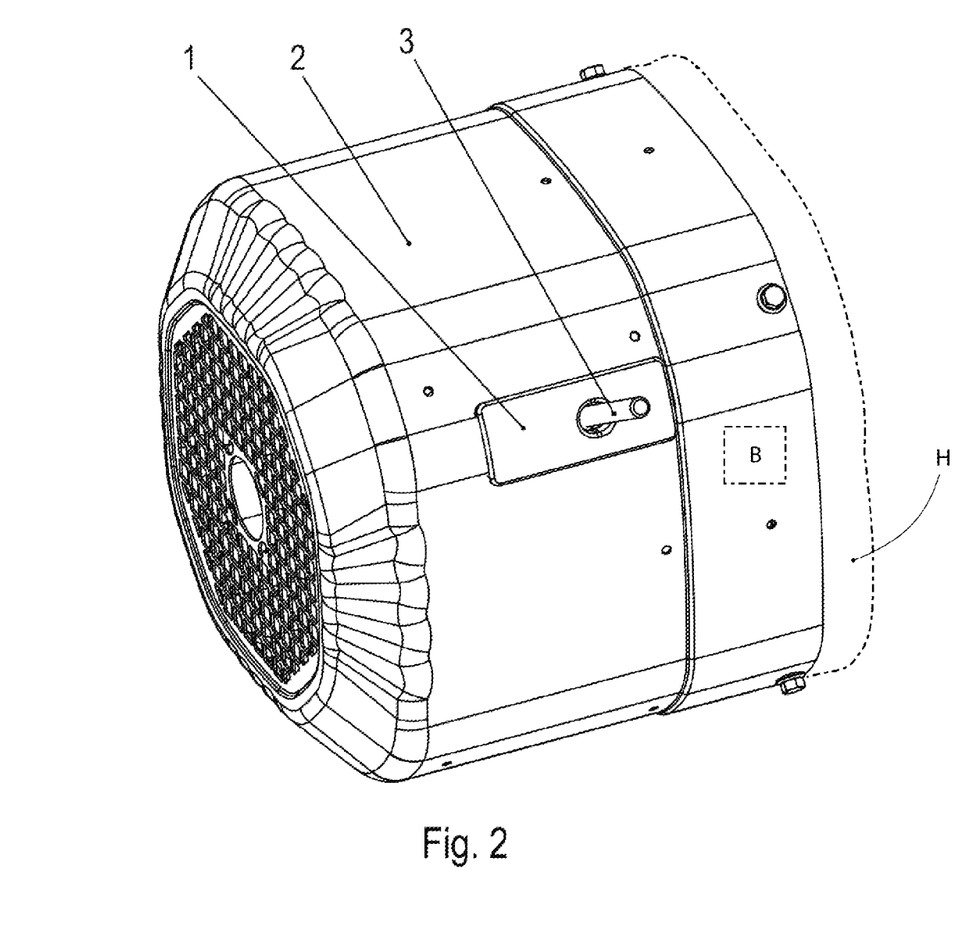
FIG. 2 is another schematic perspective view of fan cowl.
Figure 3:
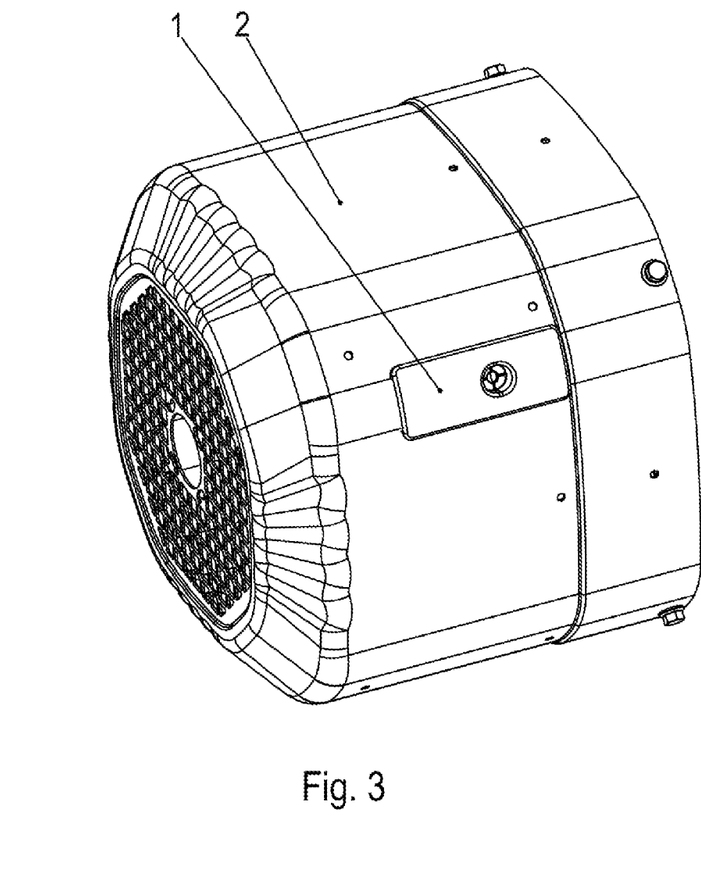
FIG. 3 is another schematic perspective view.
Figure 4:
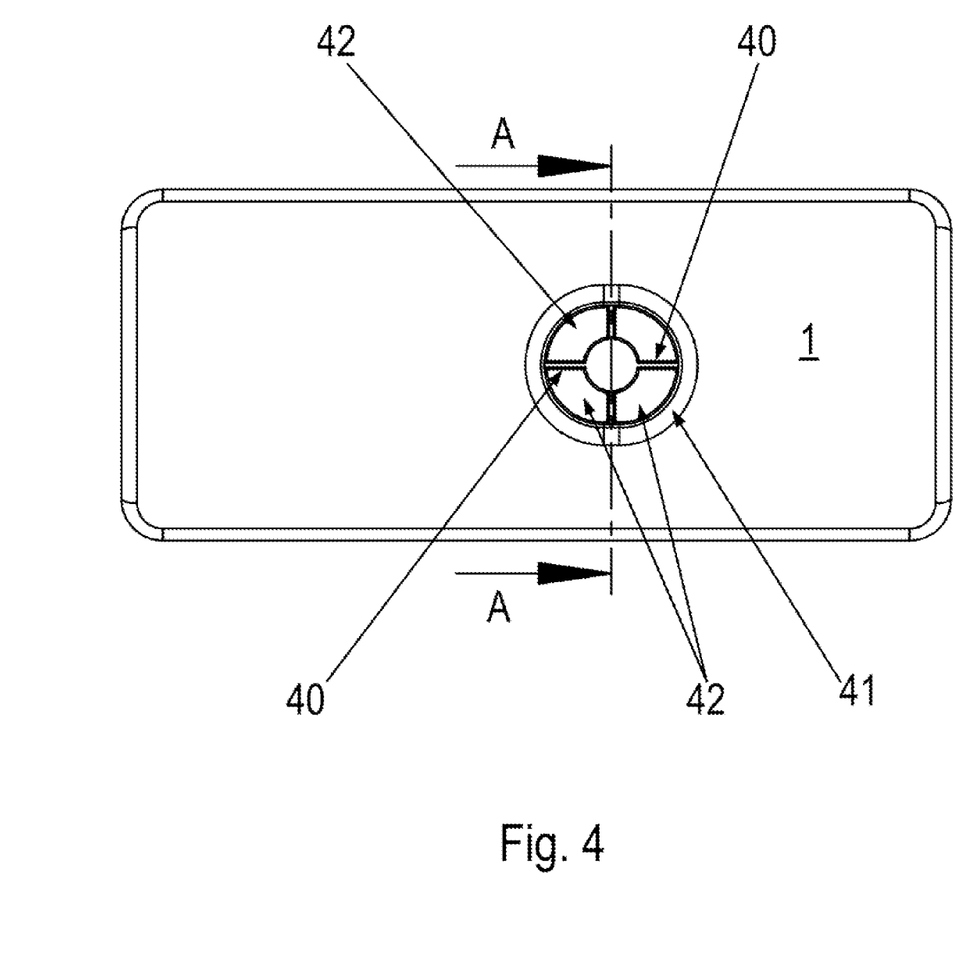
FIG. 4 is a schematic top view of cover part.
Figure 7:
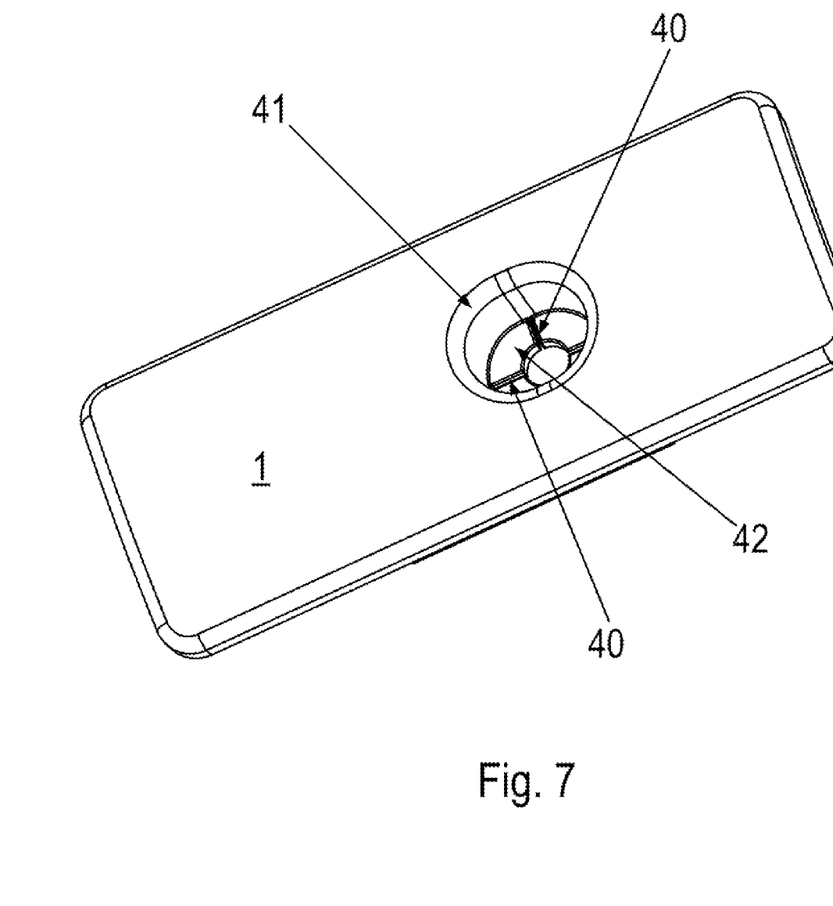
FIG. 7 is a schematic perspective view of the cover part.

As illustrated in FIG. 4 and FIG. 7, the plate-shaped area of the cover part has a depression 41 inside which a recess is situated which penetrates cover part 1 and is disposed in a centered manner between tab areas 42 situated inside the depression. Tab areas 42 are integrally formed, i.e., in one piece, especially molded, on cover part 1, in particular on the plate-shaped area of cover part 1.

In the circumferential direction oriented around the uninterrupted recess, tab areas 42 are set apart with the aid of slots from the tab area situated closest in this circumferential direction in each case.

Tab areas 42 may have an identical configuration.

Each tab area 42 covers the same radial distance region and the same axial region viewed from the center of the uninterrupted recess.

Slots 40 may be arranged in the form of cross slots.

Rod 3 has a thicker configuration than the uninterrupted recess. More specifically, rod 3 is arranged as a round part, i.e., cylindrically, in the penetration region and has a larger diameter than the inner diameter of the uninterrupted recess. As a result, tab areas 42 are elastically deflected and rest against rod 3 when rod 3 is guided through depression 41. Thus, through the elastically deflected tab areas 41 resting against rod 3 and exerting contact pressure by their elastic pretensioning, cover part 1 is therefore connected to rod 3 by force locking, so that cover part 1 is carried along in its pivot motion.

However, when this force-locking connection is overloaded, then the keyed linkage of rod 3 still remains insofar as it is guided through the uninterrupted recess of cover part 1.

The elasticity of the tab areas is configured such that the force required to push through depression 41 with the aid of rod 3 is greater than a force specified by the standard with which a test finger is allowed to exert pressure on a device satisfying the standard. This ensures high safety for persons because the test finger according to the standard is unable to pass through depression 41.

Rod 3 may be screw-fitted with a joint part of the pivot joint of the brake, which makes the pivot motion possible.

LIST OF REFERENCE NUMERALS

1 cover part
2 fan cowl
3 rod, in particular lever rod
40 slot, in particular subregion of a cross slot
41 depression, in particular recess
42 tab area
50 groove section
51 connection area

The invention claimed is:

1. A drive, comprising:
   an electric motor including a housing part;
   a brake;
   a fan cowl detachably connected to the housing part and including a recess;
   a cover part projecting through the recess; and
   a pivotable rod guidable through the cover part, pivotable relative to the brake, and adapted to manually actuate the brake;
   wherein the cover part is movable relative to the fan cowl along an axial direction of the electric motor in response to pivoting of the rod to manually actuate the brake; and
   wherein the cover part includes at least one groove section adapted to guide the cover part relative to the fan cowl in the axial direction in response to pivoting the rod to manually actuate the brake.

2. The drive according to claim 1, wherein the housing part is arranged as a stator housing part.

3. The drive according to claim 1, wherein the recess is arranged as a slot.

4. The drive according to claim 1, wherein the rod is pivotable with respect to the cover part, is arranged as a lever, and is adapted to manually actuate the brake by lifting the brake.

5. The drive according to claim 1, wherein the cover part is snapped into the fan cowl, is snapped into a slot of the fan cowl, and/or is made from rubber and/or plastic.

6. The drive according to claim 1, wherein the cover part includes a plate-shaped area and a guide region is connected to the plate-shaped area, first groove section set apart from each other in a circumferential direction being provided on the guide region, the fan cowl and/or a respective edge region of a slot of the fan cowl projecting into one of the first groove sections.

7. The drive according to claim 6, wherein an area covered by the recess in an axial direction is greater than an area covered by the guide region, an area covered by the plate-shaped area in the axial direction being larger than the area covered by the recess.

8. The drive according to claim 6, wherein second groove sections are provided on the guide region and are set apart from the first groove sections in an axial direction.

9. The drive according to claim 8, wherein each of the groove sections includes two depressions set apart from each other in a circumferential direction.

10. The drive according to claim 6, wherein the guide region of the cover part projects through a slot provided in the fan cowl and/or the plate-shaped area rests on a radially outer surface area of the fan cowl.

11. The drive according to claim 1, wherein the groove section engages an axial surface of the recess of the fan cowl.

12. A drive, comprising:
    an electric motor including a housing part;
    a brake;
    a fan cowl detachably connected to the housing part and including a recess;
    a cover part projecting through the recess; and
    a rod guidable through the cover part, movably provided on the brake and adapted to manually actuate the brake;
    wherein the cover part includes a plate-shaped area and a guide region is connected to the plate-shaped area, first groove section set apart from each other in a circumferential direction being provided on the guide region, the fan cowl and/or a respective edge region of a slot of the fan cowl projecting into one of the first groove sections;
    wherein second groove sections are provided on the guide region and are set apart from the first groove sections in an axial direction;
    wherein each of the groove sections includes two depressions set apart from each other in a circumferential direction; and wherein the depression that faces the plate-shaped area includes an insertion bevel and/or an insertion bevel pointing toward the plate-shaped area.

13. The drive according to claim 12, wherein the fan cowl is arranged in the depression of the groove section facing the plate-shaped area and/or the fan cowl rests against a radially inner surface area of the plate-shaped area, another depression of the respective groove second being set apart from the fan cowl.

14. A drive, comprising:
an electric motor including a housing part;
a brake;
a fan cowl detachably connected to the housing part and including a recess;
a cover part projecting through the recess; and
a rod guidable through the cover part, movably provided on the brake and adapted to manually actuate the brake;
wherein a depression is provided in the cover part, a recess being provided in the depression and/or centered with respect to the depression.

15. A drive, comprising:
an electric motor including a housing part;
a brake;
a fan cowl detachably connected to the housing part and including a recess;
a cover part projecting through the recess; and
a rod guidable through the cover part, movably provided on the brake and adapted to manually actuate the brake;
wherein the cover part includes a plate-shaped area and a guide region is connected to the plate-shaped area, first groove section set apart from each other in a circumferential direction being provided on the guide region, the fan cowl and/or a respective edge region of a slot of the fan cowl projecting into one of the first groove sections; and
wherein a radially uninterrupted recess is provided in a depression in the cover part and extends through the plate-shaped region and through the guide region.

16. The drive according to claim 15, wherein tab areas are provided inside the depression and are integral with the cover part and/or with the guide region of the cover part.

17. The drive according to claim 16, wherein the depression is cylindrically shape, the tab areas cover a same circumferential angle amount in a circumferential direction around a cylinder axis of the depression, and are set apart from one another at regular intervals, the tab areas covering a same radial distance region in relation to the cylinder axis, and the tab areas cover a same axial region.

18. The drive according to claim 17, wherein a slot is provided in the circumferential direction between the tab areas in relation to the cylinder axis and extends radially from the guide region to the uninterrupted recess in relation to the cylinder axis.

19. The drive according to claim 16, wherein an amount of force required to achieve elastic deflection of the tab areas, by the rod when pushing through the depression, is greater than a predetermined amount of force maximally applicable by a test finger.

20. The drive according to claim 16, wherein the uninterrupted recess is arranged radially within a radial distance region covered by the tab areas in relation to the cylinder axis.

21. The drive according to claim 16, wherein the tab areas are elastically deflected, deformed, and/or press against the rod in a elastically tensioned manner for sealing purposes, and/or the tab areas are set apart from one another at regular intervals by slots.

22. A process for manufacturing a drive that includes an electric motor including a housing part, a brake, a fan cowl detachably connected to the housing part and including a recess, a cover part projecting through the recess, and a rod guidable through the cover part, movably provided on the brake and adapted to manually actuate the brake, comprising:
selectively using a first fan cowl or a second fan cowl as the fan cowl of the drive, a wall thickness of the first fan cowl being smaller than a wall thickness of the second fan cowl;
wherein the cover part includes a groove section having a groove width equal to the wall thickness of the second fan cowl, the groove section having two depressions radially set apart from each other, the first fan cowl being arranged only in a first one of the two depressions and being set apart from a second one of the two depressions, and the second fan cowl filling and/or covering both depressions of the two depressions.

23. The method according to claim 22, wherein the first fan cowl is formed of sheet metal and/or steel sheet, and the second fan cowl is formed of a metal casting.

* * * * *